United States Patent
Gorsica et al.

(10) Patent No.: US 11,232,186 B2
(45) Date of Patent: Jan. 25, 2022

(54) SYSTEMS FOR FINGERPRINT SENSOR TRIGGERED VOICE INTERACTION IN AN ELECTRONIC DEVICE

(71) Applicant: Motorola Mobility LLC, Chicago, IL (US)

(72) Inventors: John Gorsica, Round Lake, IL (US); Thomas Merrell, St. Charles, IL (US); Kathryn Thomas, Chicago, IL (US); James Wylder, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/205,985

(22) Filed: Mar. 18, 2021

(65) Prior Publication Data

US 2021/0209210 A1 Jul. 8, 2021

Related U.S. Application Data

(62) Division of application No. 16/657,648, filed on Oct. 18, 2019, now Pat. No. 10,984,086.

(51) Int. Cl.
*G06F 21/32* (2013.01)
*G06F 3/16* (2006.01)
(Continued)

(52) U.S. Cl.
CPC ............ *G06F 21/32* (2013.01); *G06F 1/1626* (2013.01); *G06F 3/167* (2013.01); *G06K 9/00013* (2013.01); *G10L 17/22* (2013.01)

(58) Field of Classification Search
CPC ........ G06F 21/32; G06F 3/167; G06F 1/1626; G06K 9/00013; G10L 17/22; G10L 15/22;
(Continued)

(56) References Cited

U.S. PATENT DOCUMENTS 6,612,928 B1 * 9/2003 Bradford ................. G06F 21/31
463/29
9,182,889 B1 11/2015 Karlo et al.
(Continued)

OTHER PUBLICATIONS

IEEE document entitled "Authentication of Smartphone Users Using Behavioral Biometrics," by Alzubaidi et al. (2016; 29 pages) (Year: 2016).*
(Continued)

*Primary Examiner* — Brian E Miller
(74) *Attorney, Agent, or Firm* — Philip H. Burrus, IV

(57) ABSTRACT

An electronic device includes an audio capture device operable to receive audio input, a fingerprint sensor operable to receive fingerprint data, and one or more processors, operable with the audio capture device and the fingerprint sensor. The fingerprint sensor can authenticate a person as an authorized user of an electronic device while device commands are being received in the form of audio input to allow for secure voice interactions without requiring a trigger phrase. The fingerprint sensor can be used in combination with the receipt of voice input to perform two-factor authentication. The fingerprint sensor and audio capture device can be used in combination to enroll, or update enrollment, of a user interacting with a voice assistant as well.

5 Claims, 6 Drawing Sheets

(51) Int. Cl.
    *G10L 17/22*           (2013.01)
    *G06K 9/00*           (2006.01)
    *G06F 1/16*           (2006.01)

(58) Field of Classification Search
    CPC ............ G10L 2015/223; H04M 1/724; H04M 1/72454; H04M 1/72433; H04M 1/72463; H04M 1/72403; H04M 2250/74
    See application file for complete search history.

(56) References Cited

U.S. PATENT DOCUMENTS

| | | | |
|---|---|---|---|
| 9,590,984 B2* | 3/2017 | Cronin | H04L 63/0861 |
| 9,633,659 B1 | 4/2017 | Agrawal et al. | |
| 9,819,675 B1* | 11/2017 | Cronin | H04L 63/10 |
| 10,529,332 B2 | 1/2020 | Lemay | |
| 10,703,297 B1 | 7/2020 | Cohen et al. | |
| 10,878,809 B2 | 12/2020 | Gruber et al. | |
| 10,909,225 B2* | 2/2021 | Kumar Agrawal | G06F 21/32 |
| 10,978,090 B2 | 4/2021 | Binder et al. | |
| 11,009,970 B2 | 5/2021 | Hindi et al. | |
| 2010/0299642 A1 | 11/2010 | Merrell et al. | |
| 2014/0379169 A1 | 12/2014 | Camacho | |
| 2015/0161370 A1* | 6/2015 | North | G06F 21/32 726/5 |
| 2015/0281279 A1* | 10/2015 | Smith | H04L 9/3247 726/1 |
| 2016/0026841 A1 | 1/2016 | Merrell et al. | |
| 2016/0105598 A1 | 8/2016 | Zeira | |
| 2016/0252963 A1 | 9/2016 | Elkins et al. | |
| 2017/0110130 A1 | 4/2017 | Sharifi et al. | |
| 2017/0110144 A1 | 4/2017 | Sharifi et al. | |
| 2017/0213559 A1 | 7/2017 | Agrawal et al. | |
| 2018/0020349 A1* | 1/2018 | Tyagi | H04L 63/083 |
| 2018/0020350 A1* | 1/2018 | Vissa | G06K 9/00006 |
| 2018/0039769 A1* | 2/2018 | Saunders | G10L 17/22 |
| 2018/0129796 A1 | 5/2018 | Oswal et al. | |
| 2018/0130469 A1 | 5/2018 | Gruenstein | |
| 2018/0130475 A1 | 5/2018 | Page et al. | |
| 2018/0232591 A1 | 8/2018 | Hicks et al. | |
| 2018/0247065 A1* | 8/2018 | Rhee | G06F 3/167 |
| 2018/0270343 A1 | 9/2018 | Rout et al. | |
| 2019/0115018 A1 | 4/2019 | Zurek et al. | |
| 2019/0115019 A1 | 4/2019 | Zurek et al. | |
| 2019/0122670 A1 | 4/2019 | Roberts et al. | |
| 2019/0156003 A1 | 5/2019 | Alameh et al. | |
| 2019/0214022 A1 | 7/2019 | Vaquero Aviles-Casco et al. | |
| 2019/0362064 A1 | 11/2019 | Zhang et al. | |
| 2020/0134147 A1 | 4/2020 | Van Den Hoven | |
| 2020/0201970 A1 | 6/2020 | Lesso et al. | |
| 2021/0073362 A1* | 3/2021 | Alameh | G06F 21/44 |
| 2021/0117521 A1* | 4/2021 | Corsica | G10L 17/22 |
| 2021/0173667 A1* | 6/2021 | Alameh | G06F 21/32 |
| 2021/0173909 A1* | 6/2021 | Alameh | G06F 21/83 |

OTHER PUBLICATIONS

Angelo, Joao , "Two-Factor Authentication Using Biometrics", Published May 17, 2017 online at https://auth0.com/blog/two-factor-authentication-using-biometrics/.

Jonnalagadda, Harish , "One Button Nav on the Moto G5 is an Exciting New Way to Interact with your Phone", Article published online on Mar. 23, 2017 at https://www.androidcentral.com/one-button-nav-moto-g5-exciting-new-way-interact-your-phone.

Miller, Brian , "Ex Parte Quayle", U.S. Appl. No. 16/657,648, filed Oct. 18, 2019; dated Jan. 21, 2021.

Thomas, Dallas , "How to Use Your Fingerprint Scanner to Do Almost Anything with Tasker", Published Nov. 18, 2016; Available Online at https://android.gadgethacks.com/how-to/use-your-fingerprint-scanner-do-almost-anything-with-tasker-0175015/.

Miller, Brian , "NonFinal Office Action", U.S. Appl. No. 17/205,970, filed Mar. 18, 2021; dated Aug. 30, 2021.

* cited by examiner

SYSTEMS FOR FINGERPRINT SENSOR TRIGGERED VOICE INTERACTION IN AN ELECTRONIC DEVICE

CROSS REFERENCE TO PRIOR APPLICATIONS

This application is a divisional application claiming priority and benefit under 35 U.S.C. § 121 from U.S. application Ser. No. 16/657,648, filed Oct. 18, 2019, which is incorporated by reference for all purposes.

BACKGROUND

Technical Field

This disclosure relates generally to electronic devices, and more particularly to electronic devices having fingerprint sensors.

Background Art

Electronic devices, and in particular portable, wireless communication devices, are becoming increasingly technologically advanced. In response, people are becoming more dependent upon their portable electronic devices. Only a few years ago a mobile telephone was a novelty item used only for making telephone calls. By contrast, people today rely upon "smartphones" to keep up with their calendars, address books, music collections, photo collections, and so forth.

These smaller, yet more powerful, devices are being used for many different applications, in many different environments, and in many different configurations. It would be advantageous to be able to detect certain environments and configurations and adapt performance of an electronic device to provide a more seamless user interface experience.

Figure 1:
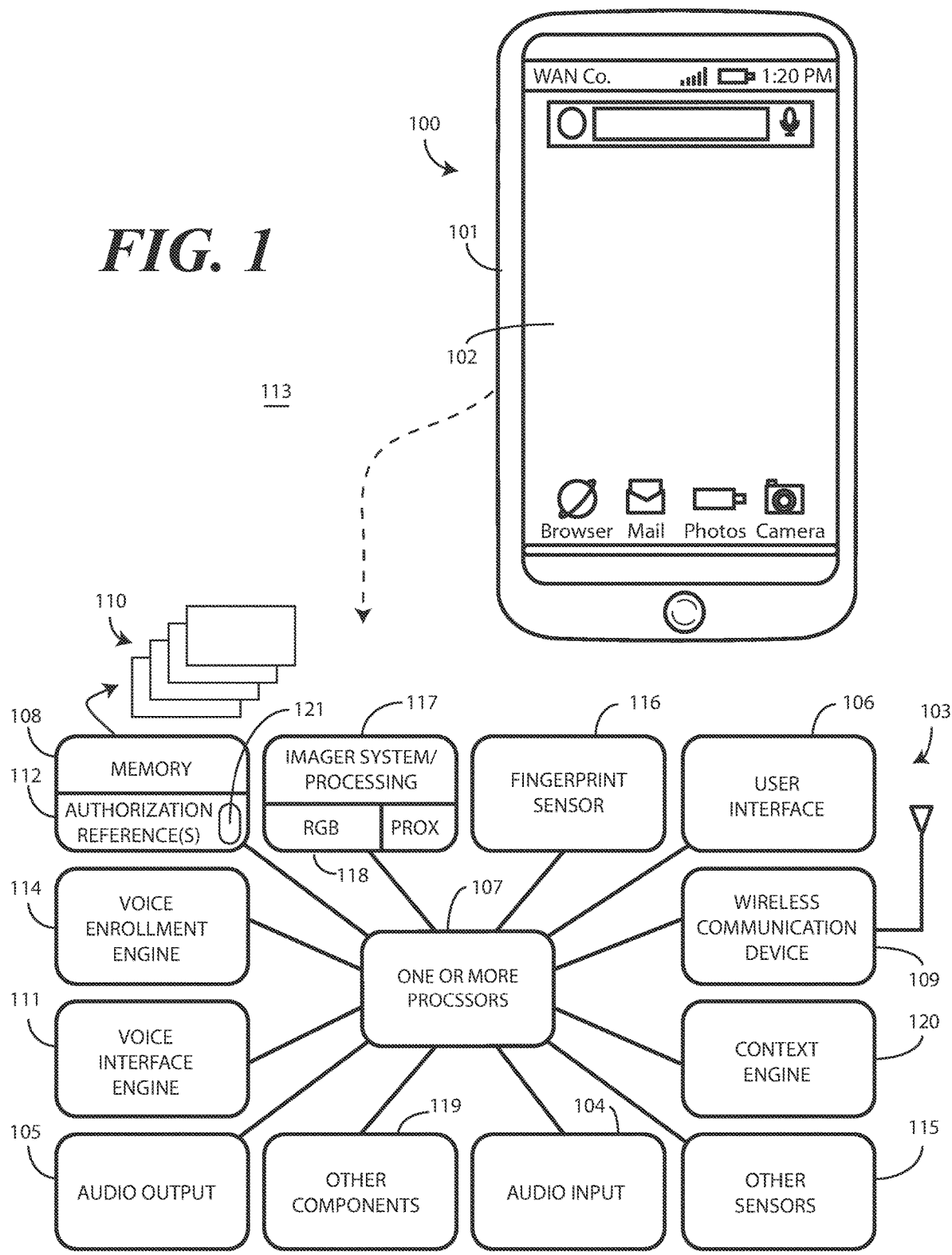
FIG. 1 illustrates one explanatory block diagram illustrating a schematic of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using fingerprint sensors of an electronic device to control, modify, and alter voice interactions with an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of altering voice interaction processes in an electronic device when a finger is detected upon a fingerprint sensor while the voice interaction processes are occurring as described herein. The non-processor circuits may include, but are not limited to, a radio receiver, a radio transmitter, signal drivers, clock circuits, power source circuits, and user input devices. As such, these functions may be interpreted as steps of a method to perform fingerprint sensor-triggered voice interactions, including bypassing trigger words, performing voice enrollment operations, updating voice enrollment profiles, and even performing two-factor authentication processes.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that users of electronic devices would prefer to have simplified—and more secure—ways of interacting electronic devices. A simpler, and more secure, way of interacting with an electronic device would more seamlessly integrate these devices into their daily lifestyles, and with the general human experience as a whole. For example, when a person asks another person a question, simply annunciating the question is all that is required to solicit a response. Retrieving information from an electronic device is not so simple. To figure out, for instance, how tall the Willis Tower is using a smartphone, a user needs to unlock the device, navigate the user interface to a web browser, type in the question, wait for the response to load, and then read the response. To be sure, communicating with prior art devices is not as seamless as communicating with a person.

There have been some advances in electronic devices recently that have simplified things a bit. Many smartphones and other electronic devices have voice-controlled interfaces. These electronic devices are equipped with voice assistant capabilities that allow authorized users to access data and retrieve information using voice commands rather than physically manipulating the electronic device. Thus, rather than typing a question into a web browser, a user can ask a voice assistant a question. However, prior to doing so, the user must activate the voice assistant. Even after doing so, the user must say a "trigger phrase" to queue the voice assistant to listen.

Using an Android.sup.™ device, for instance, a user might need to say, "OK, Google Now, how tall is the Willis Tower?" In this question, "OK, Google Now" is the trigger phrase that actuates the voice assistant capability, letting the voice assistant know that the words following the trigger phrase will constitute a device command requiring the electronic device to execute a control operation. In this example, the device command is "how tall is the Willis Tower." The control operation would be retrieving responsive information from a local or remote data store, and delivering it to the user. By using the voice assistant and trigger phrase, the user can obtain the desired information without unlocking or otherwise physically manipulating the electronic device.

While such a system is far more convenient than, for example, unlocking the device, launching a web browser application, navigating to a search engine, typing the question into the search engine window, and waiting for a response, embodiments of the disclosure contemplate that users would may frequently prefer a system that allows voice control without having to first state a trigger phrase. At the same time, those users may not want the voice assistant constantly listening in an always-ON mode of operation. In an ideal world, an electronic device would listen only when being asked a question, and would understand whenever its owner is asking for something with no trigger required to provide a more natural, humanistic experience.

Moreover, embodiments of the disclosure contemplate that many users desire additional security for some voice interactions as well. Illustrating by example, some users would prefer that electronic devices that include voice assistant capabilities first confirm that a person using the voice assistant as an authorized user of the electronic device before providing private or personal data in response to a device command. With some electronic devices now providing health-monitoring functions, financial functions, and other functions utilizing personal data, an authorized user may want data from such features delivered in response to voice commands only when the authorized user delivers those voice commands.

Embodiments of the disclosure provide solutions to these issues. Specifically, in one or more embodiments methods and systems described herein take advantage of a fingerprint sensor to authenticate a person as an authorized user of an electronic device while device commands are being received in the form of audio input. Embodiments of the disclosure also allow for secure voice interactions in an electronic device without requiring a trigger phrase. Embodiments of the disclosure can leverage the fingerprint sensor in combination with the receipt of voice input to establish "two factor" authentication of the source of the audio input so that voice interactions with an electronic device can be carried out in a more secure fashion. Embodiments of the disclosure also leverage a fingerprint sensor to enroll, or update enrollment, of a user interacting with a voice assistant.

In one or more embodiments, a fingerprint sensor is leveraged to bypass the trigger word that is generally required when delivering device commands to an electronic device in the form of audio input. For example, in one embodiment one or more processors are operable with an audio capture device that is operable to capture audio input. The one or more processors, which can include a digital signal processor, can then identify whether one or more device commands are present in the audio input.

In a first mode of operation, the one or more processors are configured to execute a control operation in response to device commands preceded by a trigger phrase identified in the audio input received by the audio capture device. However, in one or more embodiments the one or more processors are configured to transition from the first mode of operation to a second mode of operation when the fingerprint sensor is receiving fingerprint data. Accordingly, if a person positions their finger atop the fingerprint sensor, in one or more embodiments the one or more processors transition from the first mode of operation to a second mode of operation. In the second mode of operation, the one or more processors execute the control operation without requiring the trigger phrase to precede the device command.

Thus, in one or more embodiments the one or more processors "bypass" the trigger phrase requirement and execute control operations in response to only the device commands when the fingerprint sensor is receiving fingerprint data. Said differently, in one or more embodiments, when the fingerprint sensor is receiving fingerprint data, the one or more processors of the electronic device will execute control operations in response to device commands without requiring any trigger phrase to precede the device command. In one or more embodiments this functionality only occurs when no incoming call is occurring at the electronic device.

In one or more embodiments, the one or more processors can additionally determine the identity of the user prior to, or in addition to, executing the device command. For example, the one or more processors can attempt to authenticate a person as an authorized user of the electronic device by attempting to match the fingerprint data to one or more predefined authentication references stored in a memory. If the person asking a question to a voice interface engine delivers a device command requesting private data, in one or more embodiments the electronic device will execute a corresponding control operation delivering the private data only when the person is authenticated as an authorized user of the electronic device. If there is no such authentication of the person delivering the device command by the fingerprint sensor, only non-private data will be provided in response to device commands in one or more embodiments. Where this occurs, the electronic device can optionally prompt the user for additional authentication data, such as a password or other authentication factor.

Thus, in one or more embodiments the one or more processors of an electronic device execute control operations without requiring a trigger phrase to precede device commands when the fingerprint sensor is receiving fingerprint data and the fingerprint data is authenticated as being that of an authorized user of the electronic device. In such a situation, the one or more processors can execute a control operation in response to the device command extracted from the audio input, regardless of whether it involves private data or non-private data.

In another embodiment, the fingerprint sensor can be leveraged to provide "two factor" authentication that authenticates a person as an authorized user of the electronic device using two different input factors. In one or more embodiments, the two different input factors are a voiceprint and a fingerprint. For instance, in one or more embodiments a user person places their finger on the fingerprint sensor, which receives fingerprint data from the finger. The one or more processors can then attempt to identify the person as an authorized user of the electronic device by attempting to match the fingerprint data to one or more predefined authentication references stored in a memory.

In one or more embodiments, the initial touching or pressing of the fingerprint sensor also causes the audio capture device to begin listening for audio input. In one or more embodiments, while the person is being authorized using the fingerprint data from the finger, one or more processors of the electronic device perform analysis operations on the received audio input in an effort to detect a predefined authentication phrase. When the predefined authentication phrase is received, the one or more processors can attempt to again identify the person as an authorized user of the electronic device by attempting to match the voiceprint data of the predefined authentication phrase to one or more other predefined authentication references stored in a memory. Where this second match occurs, in one or more embodiments the person is authorized to use the full feature set of the electronic device. Otherwise, the one or more processors may transition the electronic device into a privacy mode of operation. The electronic device can optionally prompt the user for additional authentication data, such as a password or other authentication factor, to transition the electronic device out of the privacy mode of operation.

In still another embodiment, the fingerprint sensor can be leveraged to enhance the operation of a voice enrollment procedure. Embodiments of the disclosure contemplate that voice assistants in electronic devices must be trained to recognize trigger words, device commands, launch phrases, and other audio input delivered in the form of voice commands. "Voice enrolling" an electronic device involves delivering audio input comprising predefined words or phrases to an electronic device, sometimes repeatedly, so that the voice assistant feature can be trained as to the person's pronunciation of certain terms, cadences, diction, and so forth.

In one or more embodiments, a person initiates a voice enrollment operation by delivering user input to a user interface of an electronic device. Thereafter, in one or more embodiments the person places their finger on the fingerprint sensor, which receives fingerprint data from the finger.

The one or more processors can then attempt to identify the person as an authorized user of the electronic device by attempting to match the fingerprint data to one or more predefined authentication references stored in a memory. In one or more embodiments, where the person is authenticated as an authorized user of the electronic device, the voice enrollment process can proceed. In one or more embodiments, where the person is authenticated as an authorized user of the electronic device, the voice enrollment process can proceed only when the finger remains on the fingerprint sensor. Where the person is not authenticated as the authorized user of the electronic device, in one or more embodiments voice enrollment is prohibited. The electronic device can optionally prompt the user for additional authentication data, such as a password or other authentication factor, to move forward with the voice enrollment process in one or more embodiments.

Updating an established voice enrollment template can also leverage the fingerprint sensor for enhanced performance. In one or more embodiments, a person initiates a voice enrollment updating operation by delivering user input to a user interface of an electronic device. Thereafter, in one or more embodiments the person places their finger on the fingerprint sensor, which receives fingerprint data from the finger.

The one or more processors can then attempt to identify the person as an authorized user of the electronic device by attempting to match the fingerprint data to one or more predefined authentication references stored in a memory. In one or more embodiments, where the person is authenticated as an authorized user of the electronic device from the fingerprint data, the person is allowed to update their voice enrollment template established in a previous voice enrollment process. In one or more embodiments, where the person is authenticated as an authorized user of the electronic device, the person is allowed to update their voice enrollment template established in a previous voice enrollment process only when the finger remains on the fingerprint sensor. Where the person is not authenticated as the authorized user of the electronic device, updates of voice enrollment templates established in previous voice enrollment processes is prohibited. The electronic device can optionally prompt the user for additional authentication data, such as a password or other authentication factor, to move forward with the voice enrollment updating process in one or more embodiments.

In one or more embodiments, touching or pressing a fingerprint sensor initiates a voice interface engine while simultaneously authenticating the identity of the user by matching the fingerprint data to one or more predefined authentication references stored in a memory. In one or more embodiments, fingerprint authentication is used to gate secure information in responses to device commands by authenticating the identity of a user using a fingerprint sensor while the device command is being received. In one or more embodiments, non-private information, such as the time of day, temperature, or date, can still be delivered in response to device commands in the form of audio input even when a person is not authenticated as an authorized user using the fingerprint sensor. In one or more embodiments, simultaneous authentication of a person as an authorized user of the electronic device using a fingerprint sensor and voice phrase authentication by a voice interface engine to provide a two-factor authentication system. In one or more embodiments, authentication of a user as an authorized user of the electronic device using a fingerprint sensor can be a requirement for voice enrollment or voice enrollment updates, thereby providing a more secure version of voice enrollment procedures. In one or more embodiments, requiring that a fingerprint sensor be touched during the delivery of device commands in the form of audio input further improves the voice authentication model for trigger phrases, as well as providing a more secure version of voice template updating. Other advantages offered by embodiments of the disclosure will be obvious to those of ordinary skill in the art having the benefit of this disclosure.

Turning now to FIG. 1, illustrated therein are is one explanatory electronic device 100 configured in accordance with one or more embodiments of the disclosure. The electronic device 100 of FIG. 1 is configured as a portable electronic device. For illustrative purposes, the electronic device 100 is shown as a smartphone. However, the electronic device 100 could be any number of other devices as well, including tablet computers, laptop computers, voice assistant devices such as smart speakers, gaming devices, multimedia players, and so forth. Still other types of electronic devices can be configured in accordance with one or more embodiments of the disclosure as will be readily appreciated by those of ordinary skill in the art having the benefit of this disclosure.

While electronic device 100 is illustrated as being a hand-held device, it could also be configured as a wearable device. Illustrating by example, electronic devices configured in accordance with embodiments of the disclosure can include a housing and one or more straps that allow the electronic device to be worn around a wrist as a watch or folded over and clipped to a garment. Other types of wearable electronic devices and/or other mechanical configurations of wearable electronic devices will be obvious to those of ordinary skill in the art having the benefit of this disclosure.

The electronic device 100 includes a device housing 101, which is situated about a display 102. Also illustrated in FIG. 1 is one explanatory block diagram schematic 103 of one or more components suitable for inclusion with the electronic device 100. In one or more embodiments, the components of the block diagram schematic 103 are configured as a printed circuit board assembly situated within the device housing 101 of electronic device 100. Various components can be electrically coupled together by conductors or a bus disposed along one or more printed circuit boards. It should be noted that the block diagram schematic 103 includes many components that are optional, but which are included in an effort to demonstrate how varied electronic devices configured in accordance with embodiments of the disclosure can be.

Illustrating by example, in one or more embodiments the electronic device 100 includes an audio input device 104 to receive audio input and an audio output device 105 to deliver audio output. Where the electronic device 100 is configured to be purely a voice assistant device, a display 102 may be optional, in that it is not required for this voice-based user interaction convention.

Thus, it is to be understood that the block diagram schematic 103 of FIG. 1 is provided for illustrative purposes only and for illustrating components of one electronic device 100 in accordance with embodiments of the disclosure. The block diagram schematic 103 of FIG. 1 is not intended to be a complete schematic diagram of the various components required for an electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 103 of FIG. 1 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 1, and other components that are shown may not be needed and can therefore be omitted.

The illustrative block diagram schematic 103 includes a user interface 106. In one or more embodiments, the user interface 106 includes the display 102, which may optionally be touch-sensitive. Users can deliver user input to the display 102 of such an embodiment by delivering touch input from a finger, stylus, or other objects disposed proximately with the display 102. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

In one embodiment, the electronic device 100 includes one or more processors 107. In one embodiment, the one or more processors 107 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 103. Each of the application processor and the auxiliary processor(s) can be configured to process and execute executable software code to perform the various functions of the electronic device 100 with which the block diagram schematic 103 operates. A storage device, such as memory 108, can optionally store the executable software code used by the one or more processors 107 during operation.

In this illustrative embodiment, the block diagram schematic 103 also includes a communication circuit 109 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, 5G NR, and other networks. Still other networks will be obvious to those of ordinary skill in the art having the benefit of this disclosure.

The communication circuit 109 may also utilize wireless technology for communication, such as, but are not limited to, peer-to-peer or ad hoc communications such as HomeRF, Bluetooth and IEEE 802.11 (a, ac, ah, ad, ax, aj, ak, ay, az, b, ba, g, x, or n); and other forms of wireless communication such as infrared technology. The communication circuit 109 can include wireless communication circuitry, one of a receiver, a transmitter, or transceiver, and one or more antennas.

In one embodiment, the one or more processors 107 can be responsible for performing the primary functions of the electronic device with which the block diagram schematic 103 is operational. For example, in one embodiment the one or more processors 107 comprise one or more circuits operable with the user interface 106 to present presentation information to a user. Additionally, the one or more processors 107 can be operable with the audio output device 105 to deliver audio output to a user. The executable software code used by the one or more processors 107 can be configured as one or more modules 110 that are operable with the one or more processors 107. Such modules 110 can store instructions, control algorithms, and so forth.

In one or more embodiments, the one or more processors 107 can define one or more process engines. Examples of these process engines include a voice interface engine 111 and a context engine 120. Each engine can be a component of the one or more processors 107, operable with the one or more processors 107, defined by the one or more processors 107, and/or integrated into the one or more processors 107. Other configurations for these engines, including as software or firmware modules operable on the one or more processors 107, will be obvious to those of ordinary skill in the art having the benefit of this disclosure.

In one or more embodiments, the one or more processors 107 define a voice interface engine 111. The voice interface engine 111 can include hardware, executable code, and speech monitor executable code in one embodiment. The voice interface engine 111 can be operable with one or more predefined authentication references 112 stored in memory 108. With reference to audio input, the predefined authentication references 112 can comprise representations of basic speech models, representations of trained speech models, or other representations of predefined audio sequences that are used by the voice interface engine 111 to receive and identify voice commands that are received with audio input captured by an audio input device 104. The voice interface engine 111 can also use one or more predefined authentication references 112 to identify a person delivering audio input as an authorized user of the electronic device 100 by comparing data extracted from the audio input in the form of a voice print to the one or more predefined authentication references 112 to determine whether they sufficiently match.

In one embodiment, the voice interface engine 111 performs voice recognition operations. In one or more embodiments, the voice interface engine 111 functions with the audio input device 104 as an audio capture device to receive and capture audio input from a source, such as a person, authorized user, plurality of persons within an environment 113 about the electronic device 100. Regardless of the specific implementation utilized in the various embodiments, the voice interface engine 111 can access various speech models stored with the predefined authentication references 112 to identify speech commands in one or more embodiments.

In one embodiment, the voice interface engine 111 functions as a voice assistant configured to implement a voice control feature that allows the electronic device 100 to function as a voice assistant device. In one or more embodiments, the voice interface engine 111 uses voice recognition, speech synthesis, and natural language processing to receive audio input comprising a voice command from a source, determine the appropriate response to the voice command, and then deliver the response in the form of audio output in response to receiving the audio input from the source. When so configured, a user can use the emanation of the audio input from their mouth to cause the one or more processors 107 of the electronic device 100 to execute a control operation.

For example, in one or more embodiments the voice interface engine 111 receives, from the audio input device 104, audio input from a source. The voice interface engine 111 can attempt to identify the source from the audio input. In this manner, the voice interface engine 111 can determine whether the source is a known source, e.g., an authorized user of the electronic device 100.

In one or more embodiments, the voice interface engine 111 is configured to implement a voice control feature that allows a user to speak a specific device command to cause the one or more processors 107 to execute a control operation. For example, the user may say, "How tall is the Willis Tower?" This question comprises a device command requesting the one or more processors 107 to retrieve, with the communication circuit 109, information from the Internet to answer the question. Consequently, this device command can cause the one or more processors 107 to access an application module, such as a web browser, to search for the answer and then deliver the answer as audible output via an audio output of the other components 119. In short, in one embodiment the voice interface engine 111 listens for voice commands, processes the commands and, in conjunction with the one or more processors 107, returns an output that is the result of the user's intent.

A voice enrollment engine 114 can be operable with the voice interface engine 111. In one or more embodiments, the voice enrollment engine 114 facilitates voice enrollment that enables the execution of device commands by the one or more processors 107 in response to audible input received by the audio input device 104. In one or more embodiments, the voice interface engine 111 must be initially and/or continually trained to recognize trigger words, device commands, launch phrases, and other audio input delivered in the form of voice commands. Accordingly, the voice enrollment engine 114 facilitates voice enrolling in the electronic device 100. This can include processing audio input captured by the audio input device 104 comprising predefined words or phrases, sometimes repeatedly, so that the voice interface engine 111 can be trained as to the person's pronunciation of certain terms, cadences, diction, and so forth.

Various sensors 115 can be operable with the one or more processors 107. In the illustrative embodiment of FIG. 1, the sensors 115 include a fingerprint sensor 116. In one embodiment, the fingerprint sensor 116 includes its own processor to perform various functions, including detecting a finger touching the fingerprint sensor 116, capturing and storing fingerprint data from the finger, and optionally identifying or authenticating a user based upon the fingerprint data in conjunction with the one or more predefined authentication references 112 stored in the memory 108.

In one or more embodiments the processor of the fingerprint sensor 116 can, as one pre-processing step, perform a preliminary authentication of the user by comparing fingerprint data captured by the fingerprint sensor 116 to a predefined authentication reference 112 stored in memory 108, while secondary authentication is performed by the one or more processors 107. Where included, the processor of the fingerprint sensor 116 can be an on-board processor. Alternatively, the processor can be a secondary processor that is external to, but operable with, the fingerprint sensor 116 in another embodiment. Other configurations will be obvious to those of ordinary skill in the art having the benefit of this disclosure.

In one embodiment, the fingerprint sensor 116 can include a plurality of sensors. The fingerprint sensor 116 can be a complementary metal-oxide-semiconductor active pixel sensor digital imager or any other fingerprint sensor. The fingerprint sensor 116 can be configured to capture, with the plurality of sensors, a live scan of a fingerprint pattern from a finger disposed along its surface, and to store this information as fingerprint data from the user's finger. The fingerprint sensor 116 may also be able to capture one or more images with the plurality of sensors. The images can correspond to an area beneath a surface of skin. The fingerprint sensor 116 can compare the fingerprint data or skin images to one or more predefined authentication references 112 to authenticate a user in an authentication process. The fingerprint sensor 116 can take other forms as well, including that of a capacitive fingerprint sensor or an ultrasonic fingerprint sensor. Other types of fingerprint sensors will be obvious to those of ordinary skill in the art having the benefit of this disclosure.

In one embodiment, the fingerprint sensor 116 can be a single function device. In other embodiments, the fingerprint sensor 116 can be a dual or multifunction device. Illustrating by example, in one embodiment the fingerprint sensor 116 is solely responsible for receiving fingerprint data from a user and either authenticating the user or determining that the user is unauthorized to use the electronic device 100. This would be a single function fingerprint sensor.

In other embodiments, the fingerprint sensor 116 may be capable of performing multiple functions. Again illustrating by example, in one embodiment the fingerprint sensor 116 can receive fingerprint data from a user and either authenticate the user or determine that the user is unauthorized to use the electronic device 100. However, the fingerprint sensor 116 may also be configured as a push button. Thus, by touching the fingerprint sensor 116 the user may deliver fingerprint data only. However, by touching and pressing the fingerprint sensor 116, the fingerprint sensor 116 may both authenticate the user by receiving the fingerprint data from the touch input, as well as perform a second function in response to the push button being depressed.

In one embodiment, the fingerprint sensor 116 is to detect a finger proximately located with the fingerprint sensor 116. The fingerprint sensor 116 can optionally be configured to determine that the object touching or otherwise proximately located with the fingerprint sensor 116 is actually a finger and not an object incapable of authentication. Where the object is a finger, the fingerprint sensor 116 can then capture fingerprint data from the finger and perform other pre-processing such as noise filtering and so forth.

In one or more embodiments, the fingerprint sensor 116 is further to authenticate or identify a user from the received fingerprint data. The one or more processors 107 can perform this operation as well. For example, in one embodiment, one of the fingerprint sensor 116 or the one or more processors 107 can perform a matching function. The fingerprint sensor 116 or the one or more processors 107, after having received the fingerprint data, can then perform a matching process to determine whether the fingerprint data substantially matches one or more predefined authentication references 112 stored in the memory 108.

As will be described in more detail below with reference to FIGS. 2-5, the fingerprint sensor 116 can be leveraged to enhance user interactions with the electronic device 100. For instance, in one embodiment the fingerprint sensor 116 can be used to bypass the requirement of a trigger phrase prior to executing control operations in response to device commands.

Illustrating by example, in one embodiment the one or more processors 107 and/or the voice interface engine 111 are configured to execute control operations in response to device commands received in the form of audio input by the audio input device 104 only when those device commands are preceded by a trigger phrase when operating in a first mode of operation. However, in one embodiment the one or more processors 107 and/or voice interface engine 111 transition from a first mode of operation to a second mode of operation when the fingerprint sensor 116 is receiving fingerprint data while the audio input device 104 is receiving the audio input. In the second mode of operation the one or more processors 107 and/or voice interface engine 111 execute control operations in response to device commands without requiring that the trigger phrase precede the device command. Thus, in one embodiment, touching the fingerprint sensor 116 can cause the trigger phrase to be bypassed.

In another embodiment, the fingerprint sensor 116 can be used with the voice interface engine 111 to provide two-factor authentication. In one embodiment, when the fingerprint sensor 116 receives fingerprint data from a person touching the fingerprint sensor 116, the one or more processors 107 and/or fingerprint sensor 116 can compare the fingerprint data to one or more predefined authentication references 112 stored in memory 108 to determine whether the person can be authenticated as an authorized user of the electronic device 100. Upon identifying the fingerprint data as belonging to an authorized user of the electronic device 100, the one or more processors 107 and/or fingerprint sensor 116 can cause the audio input device 104 to capture audio input.

The voice interface engine 111 can then, upon identifying a device command being within the audio input, can attempt to identify the source of the audio input from the audio input. For example, the voice interface engine 111 can compare data, such as a voice print, extracted from the audio input with one or more predefined authentication references 112 stored in memory 108 to determine whether the person can be authenticated as an authorized user of the electronic device 100.

In one or more embodiments, when both the fingerprint sensor 116 and the voice interface engine 111 simultaneously identify the fingerprint data and voiceprint data, respectively, as coming from an authorized user of the electronic device 100, the one or more processors 107 can execute a control operation in response to the device command identified in the audio input. This can occur regardless of the type of control operation, e.g., whether it requires private data or non-private data. However, in one or more embodiments when one or both of the fingerprint sensor 116 and the voice interface engine 111 fail to identify the fingerprint data and/or voiceprint data, respectively, as coming from an authorized user of the electronic device 100, the one or more processors 107 will only execute the control operation in response to device commands when those control operations do not require private data.

In one or more embodiments, the user interface 106 receives user input initiating a voice enrollment operation employing the voice enrollment engine 114. In one or more embodiments, the fingerprint sensor 116 receives fingerprint data after the user input initiating the voice enrollment operation, but before performing the voice enrollment operation. In one or more embodiments, upon the fingerprint sensor 116 and/or one or more processors 107 identifying the fingerprint data as belonging to an authorized user of the electronic device 100, the one or more processors cause the audio input device 104 to capture audio input for use by the voice enrollment engine 114 in the voice enrollment operation. Thus, by simultaneously verifying fingerprint data received by the fingerprint sensor 116 during the voice enrollment operation, a more secure form of voice enrollment is provided.

The fingerprint sensor 116 can be leveraged to make voice enrollment updates more seamless as well. For example, when an authorized user wants to update a voice enrollment data profile 121 stored in memory 108, in one or more embodiments they are required to deliver fingerprint data to the fingerprint sensor 116 in addition to initiating the voice enrollment updating operation with the voice enrollment engine 114. Upon the fingerprint sensor 116 identifying the fingerprint data as belonging to an authorized user of the electronic device 100, the voice enrollment engine 114 updates the voice enrollment data profile with additional audio input received by the audio input device 104.

This identification feature during voice enrollment updating can be used to distinguish users as well. If, for example, two twins are both authorized users, their voices may sound remarkably similar. To ensure that private data of one twin is not given to another without authorization, the fingerprint sensor 116 can be leveraged to facilitate both initial voice enrollment and subsequent voice enrollment updates, thereby providing a more secure version of voice enrollment and a more secure version of voice enrollment data profile updating.

The one or more sensors 115 can also include a touch sensor. The touch sensor can include a capacitive touch sensor, an infrared touch sensor, resistive touch sensors, or another touch-sensitive technology. Another example of a sensor 115 is a geo-locator that serves as a location detector able to determine location data of the electronic device 100. One or more motion detectors can be configured as an orientation detector that determines an orientation and/or movement of the electronic device 100 in three-dimensional space. An accelerometer, gyroscopes, or other device can be used as a motion detector in an electronic device.

The one or more sensors can also include one or more proximity sensors. The proximity sensors can take various forms. In one or more embodiments, the one or more proximity sensors fall in to one of two camps: active proximity sensors and "passive" proximity sensors. A "proximity sensor component" comprises a signal receiver only that does not include a corresponding transmitter to emit signals for reflection off an object to the signal receiver. Proximity sensor components are sometimes referred to as a "passive IR detectors" due to the fact that the person is the active transmitter.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. A signal emitter transmits a beam of infrared light that reflects from a nearby object and is received by a corresponding signal receiver. Proximity detector components can be used, for example, to compute the distance to any nearby object from characteristics associated with the reflected signals. Other types of proximity sensors suitable for use with the electronic device 100 will be obvious to those of ordinary skill in the art having the benefit of this disclosure.

An imager processor system 117 can be included in the electronic device 100 and can be operable with the one or more processors 107. The imager processor system 117 is operable with an imager 118 in one or more embodiments. In one embodiment, the imager 118 comprises a two-dimensional imager configured to receive at least one image of a person within an environment of the electronic device 100. In one embodiment, the imager 118 comprises a two-dimensional Red-Green-Blue (RGB) imager. In another embodiment, the imager 118 comprises an infrared imager. Other types of imagers suitable for use as the imager 118 of electronic device 100 will be obvious to those of ordinary skill in the art having the benefit of this disclosure.

Other components 119 operable with the one or more processors 107 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 119 can also include a mechanical output component such as vibrating or motion-based mechanisms.

The other components 119 can optionally include a barometer operable to sense changes in air pressure due to elevation changes or differing pressures of the electronic device 100. The other components 119 can also optionally include a light sensor that detects changes in optical intensity, color, light, or shadow in the environment of an electronic device.

In one or more embodiments, the one or more processors 107 a context engine 120. The context engine 120 can be operable with the various sensors 115 to detect, infer, capture, and otherwise determine persons and actions that are occurring in an environment about the electronic device 100. For example, where included one embodiment of the context engine 120 determines assessed contexts and frameworks using adjustable algorithms of context assessment employing information, data, and events. These assessments may be learned through repetitive data analysis. Alternatively, a user may employ the user interface 106 to enter various parameters, constructs, rules, and/or paradigms that instruct or otherwise guide the context engine 120 in detecting multi-modal social cues, emotional states, moods, and other contextual information. The context engine 120 can comprise an artificial neural network or other similar technology in one or more embodiments.

In one or more embodiments, the context engine 120 is operable with the one or more processors 107. In some embodiments, the one or more processors 107 can control the context engine 120. In other embodiments, the context engine 120 can operate independently, delivering information gleaned from detecting multi-modal social cues, emotional states, moods, and other contextual information to the one or more processors 107. The context engine 120 can receive data from the various sensors. In one or more embodiments, the one or more processors 107 are configured to perform the operations of the context engine 120.

Figure 2:
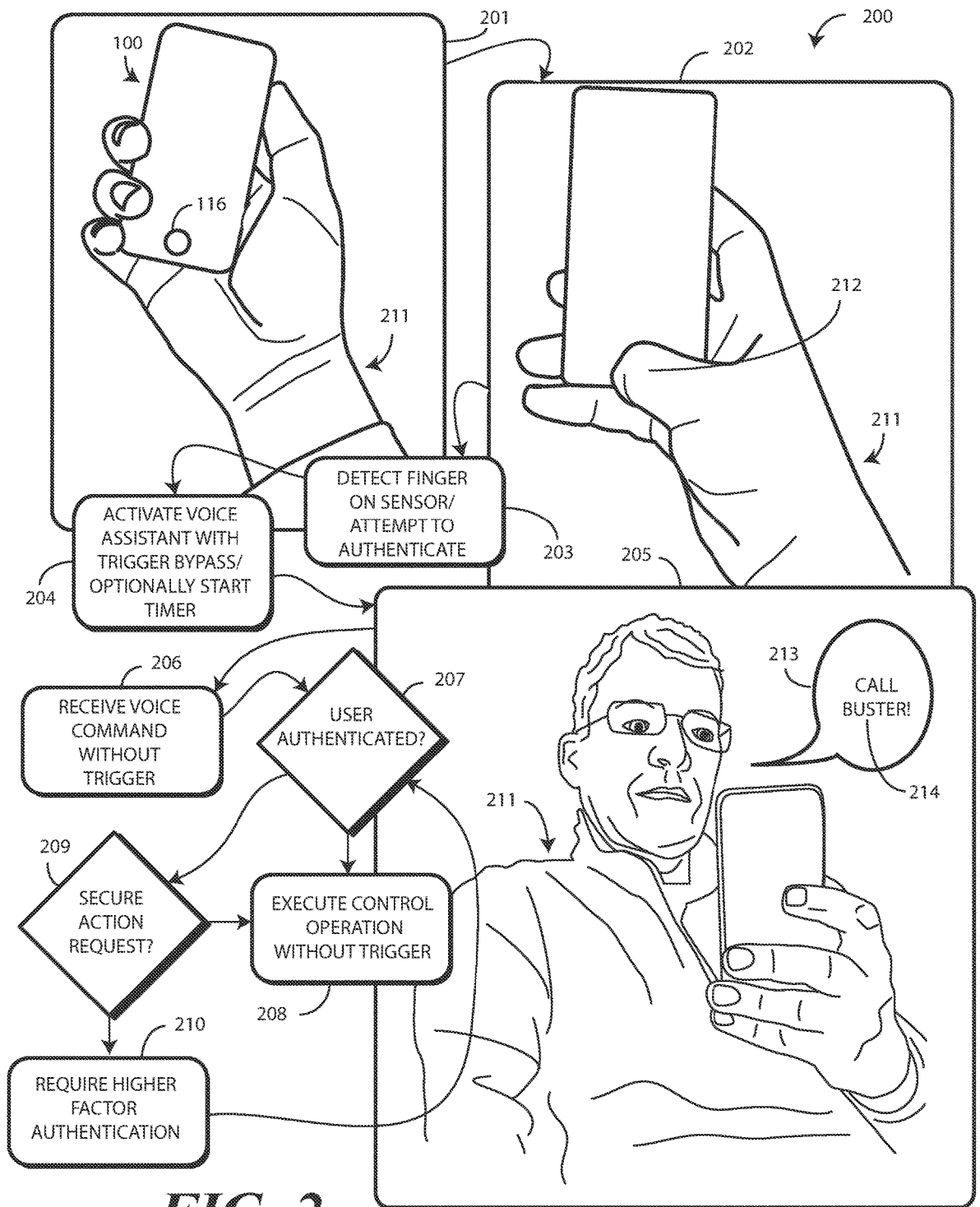
FIG. 2 illustrates one explanatory method in accordance with one or more embodiments of the disclosure.

Now that various hardware components have been described, attention will be turned to methods of using electronic devices in accordance with one or more embodiments of the disclosure. Turning now to FIG. 2, illustrated therein is one explanatory method 200 for the electronic device 100 of FIG. 1. Alternate methods will be described thereafter with reference to subsequent figures.

At step 201 a user 211 is holding an electronic device 100 configured in accordance with one or more embodiments of the disclosure. As shown, the electronic device 100 includes a fingerprint sensor 116. As previously described, the electronic device 100 also includes one or more processors (107), a voice interface engine (111), and an audio input device (104), which in one embodiment comprises one or more microphones.

In one or more embodiments, the one or more processors (107) are configured to operate multiple modes of operation. For example, since the electronic device 100 includes the voice interface engine (111), which can function as a voice assistant, the one or more processors (107) can operate in a first mode of operation where they execute a control operation in response to a device command when the device command is preceded by a trigger phrase identified in audio input received by the audio input device (104). However, under certain circumstances, the one or more processors (107) can transition to a second mode of operation as well. The second mode of operation can take different forms, as will be explained below.

At step 202, the user 211 places a finger 212 on the fingerprint sensor 116. Accordingly, the finger 212 delivers fingerprint data to the fingerprint sensor 116, with the fingerprint sensor 116 receiving the same at step 203. At step 203, the fingerprint sensor 116 and/or one or more processors (107) additionally attempt to authenticate the fingerprint data as belonging to an authorized user of the electronic device 100. In one or more embodiments, this authentication comprises comparing the fingerprint data to one or more predefined authentication references (112) stored in the memory (108) to determine whether the fingerprint data sufficiently matches at least one predefined reference.

At step 204, the one or more processors (107) actuate the audio input device (104) in response to the fingerprint sensor 116 receiving the fingerprint data at step 203. In one or more embodiments, the audio input device (104) is now active to receive audio input.

In one or more embodiments, step 204 also transitions the one or more processors (107) from the first mode of operation to a second mode of operation in response to the fingerprint sensor 116 receiving the fingerprint data. In one or more embodiments, when operating in the second mode of operation the one or more processors (107) execute control operations without requiring any trigger phrase be present in the audio input received by the audio input device (104). In short, in one or more embodiments when the fingerprint sensor 116 receives fingerprint data, the one or more processors (107) "bypass" the trigger phrase requirement and execute control operations in response to only the device commands.

At step 205, the user 211 is delivering audio input 213 to the audio input device (104). The audio input 213 comprises a device command 214. In this example, the device command 214 is "Call Buster." However, as shown, the device command 214 is not preceded by any trigger phrase, such as "OK, Google, now . . . "

At step 206, the voice interface engine (111), operating in tandem with the audio input device (104), receives the audio input 213. In one or more embodiments, step 206 also comprises the voice interface engine (111) identifying the device command 214 from the audio input 213. In one or more embodiments, a device command 214 comprises a call to action. Illustrating by example, the question "How are you doing?" is not a device command because no action is requested. By contrast, the statement "Call Buster" can be a device command 214 because it includes a call to action, namely, that a person be contacted telephonically.

Decision 207 determines whether the fingerprint data has authenticated the user 211 as an authorized user of the electronic device. Where it does, the method 200 moves to step 208. Where it does not, the method moves to decision 209.

As noted above, the second mode of operation can take different forms. In a first form, referred to herein as a normal second mode of operation, the one or more processors (107) execute control operations in response to device commands without requiring the trigger phrase to precede the device command while the fingerprint sensor 116 receives fingerprint data regardless of the type of data that is used. When the fingerprint sensor 116 and/or one or more processors (107) identify the fingerprint data received by the fingerprint sensor 116 at step 203 as belonging to an authorized user of the electronic device 100, the one or more processors (107) enter the normal second mode of operation in one or more embodiments by moving to step 208. At step 208, the one or more processors execute the control operation in response to the device command 214, and without requiring the trigger phrase to precede the device command 214. Accordingly, in this example the one or more processors (107) cause the communication circuit (109) to call Buster.

In one or more embodiments, step 208 comprises the one or more processors (107) executing the control operation without requiring the trigger phrase precede the device command 214 only when the device command 214 is received while the fingerprint sensor 216 receives the fingerprint data. Said differently, in one or more embodiments step 208 comprises executing the control operation without requiring that the trigger phrase precede the device command 214 only when the fingerprint sensor 116 receives the fingerprint data while the device command 214 is received. Thus, if the user 211 takes the finger 212 off the fingerprint sensor 116 before delivering the audio input 213, in one or more embodiments the method 200 moves to step 210 rather than step 208.

In a second form of the second mode of operation, referred to herein as a privacy mode of operation, the one or more processors (107) only execute control operations in response to device commands without requiring the trigger phrase to precede the device command while the fingerprint sensor 116 receives fingerprint data when the data involved is not of a sensitive or personal nature, or alternatively, where the control operations have not been precluded in the electronic device 100 using device settings. When the fingerprint sensor 116 and/or one or more processors (107) fail to identify the fingerprint data received by the fingerprint sensor 116 at step 203 as belonging to an authorized user of the electronic device 100, the one or more processors (107) enter the privacy mode of operation in one or more embodiments.

In one or more embodiments, the privacy mode of operation limits or restricts access to at least some information via a user interface of an electronic device. Embodiments of the disclosure contemplate that a user may not want unauthorized users to be privy to private information annunciated from a loudspeaker. This is especially true when the audible output includes an enunciation of personal information. With this unforeseen problem in mind, the method 200 of FIG. 2 functions to determine whether the fingerprint data received at step 203 belongs to an authorized user of the electronic device 100 prior to delivering a response to the device command 214.

In one or more embodiments, when in the privacy mode of operation the one or more processors (107) will allow access to non-sensitive information, such as Internet search engines, while precluding access to sensitive or private information, such as electronic mail. For instance, an authorized user of the electronic device 100 may not care if a third party delivers a voice command to the electronic device 100 asking it to search for the answer to the question, "How tall is the Willis Tower?" Accordingly, when in the privacy mode of operation, access to an Internet search engine may be granted so the electronic device 100 can search for, and deliver, this answer.

However, the authorized user may not want a third party to hear the electronic device 100 read electronic mail correspondence from their doctor giving a medical diagnosis. Similarly, the authorized user may not want the electronic device 100 to read to a third party a "Dear John" email from their significant other breaking up with them, or a communication from their significant other using expletives after the authorized user forgot an anniversary. Accordingly, when operating in the privacy mode of operation, the one or more processors (107) of the electronic device 100 may allow access to non-sensitive applications while protecting sensitive and/or private applications.

Decision 209 determines whether sensitive information is required for the one or more processors (107) to execute the control operation in response to the device command 214 without requiring the trigger phrase to precede the device command 214 while the fingerprint sensor 116 receives fingerprint data. In this example, calling Buster requires no sensitive information. However, making such a call would use battery power of the electronic device 100, as well as consume data bandwidth, which may be limited under the service provider plan with which the electronic device 100 is operable. Accordingly, for such "grey area" conditions, in one or more embodiments the authorized user of the electronic device 100 can determine whether such control operations are permitted in the menu settings using the user interface (106).

If sensitive information is not required, or if the control operation is not precluded via user settings, as determined at decision 209, the method 200 moves to step 208 in the normal second mode of operation. In one or more embodiments, step 208 comprises the one or more processors (107) executing a control operation, e.g., causing the communication circuit (109) to make a telephonic voice call to Buster, without requiring that the trigger phrase precede the device command 214.

If sensitive information is required, or if the control operation is precluded via user settings, as determined at decision 209, the method 200 moves to the privacy mode of operation at step 210. In one or more embodiments, step 210 comprises the one or more processors (107) requiring at least one additional authentication input be delivered to the user interface (106) of the electronic device 100. For example, the one or more processors (107) may prompt for a password, pin, voice authentication procedure, or other higher authentication factor at the user interface (106). In one or more embodiments, step 210 occurs when both the fingerprint sensor 216 fails to identify the fingerprint data as belonging to the authorized user of the electronic device 100 and the device command 214 involves private data.

When the higher authentication factor is received at the user interface (106) of the electronic device 100, the method 200 returns to decision 207 where the authentication process repeats using the higher authentication factor. In one or more embodiments, the method 200 will not return to step 208 until the at least one authentication factor matches a predefined criterion. Illustrating by example, if step 210 prompts the user 211 for a password, the one or more processors (107) can compare the password to the predefined authentication references (112) stored in memory (108) to determine whether there is a match, and so forth. In the illustrative example of FIG. 2, the user 211 is the authorized user of the electronic device 100. Thus, the method 200 proceeds from decision 207 to step 208 without step 210.

Figure 3:
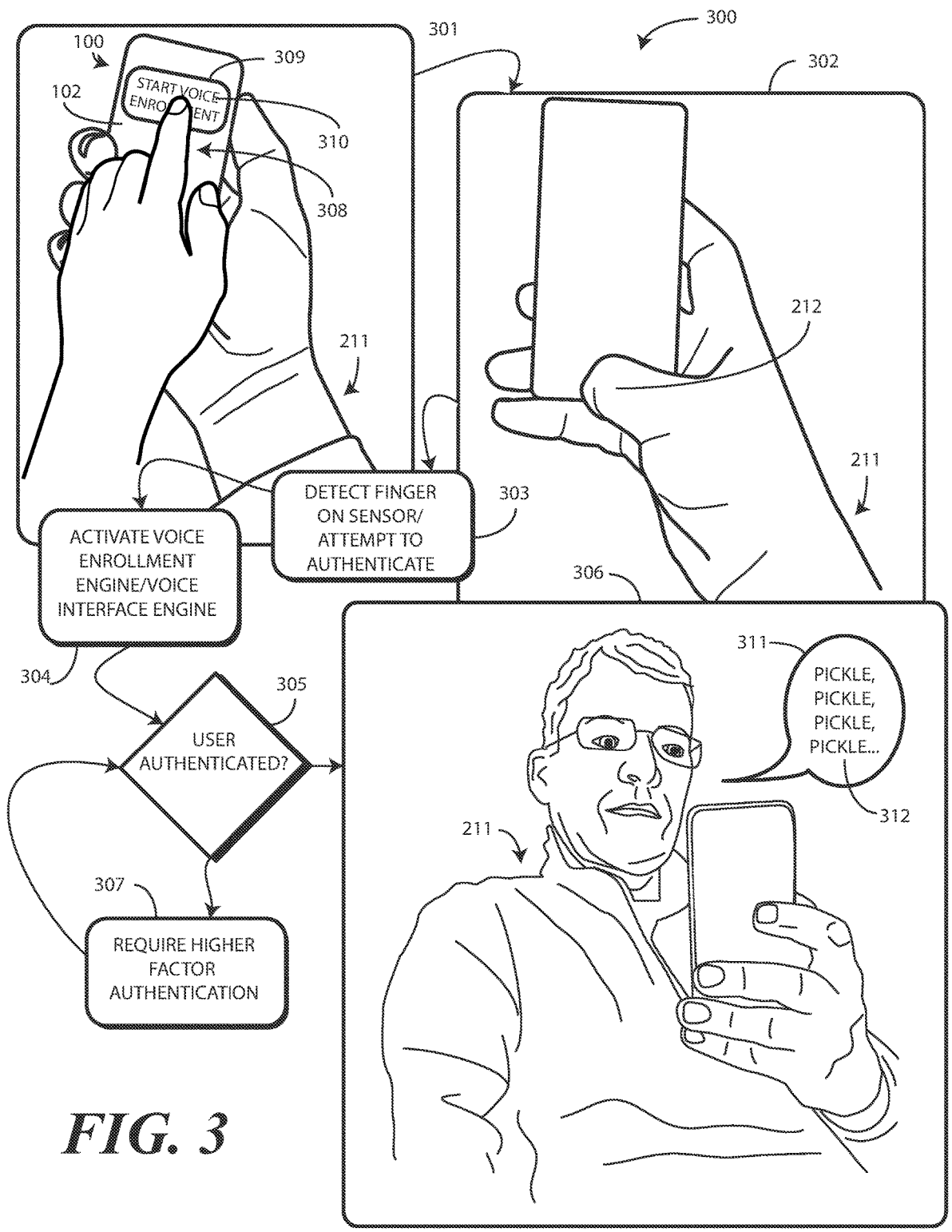
FIG. 3 illustrates another explanatory method in accordance with one or more embodiments of the disclosure.

Turning now to FIG. 3, illustrated therein is another explanatory method 300 for the electronic device 100 of FIG. 1. At step 301 a user 211 is holding an electronic device 100 configured in accordance with one or more embodiments of the disclosure. As previously described, the electronic device 100 includes a fingerprint sensor (116), one or more processors (107), a voice interface engine (111), a voice enrollment engine (114), and an audio input device (104).

In one or more embodiments, so as to enable the voice interface engine (111) to function as a voice assistant, the voice enrollment engine (114) must first enroll users of the system by creating a voice enrollment data profile (121) in the memory (108) of the electronic device. At step 301, the user 211 wants to enroll. Accordingly, the user 211 is delivering user input 308 to the display 102 of the electronic device by touching a user actuation target 309 to initiate a voice enrollment operation 310, which in this example is initial enrollment with the voice enrollment engine (114). At step 301, the user interface (106) of the electronic device 100 receives this user input 308 initiating the voice enrollment operation 310 via the display 102.

At step 302, the user 211 places a finger 212 on the fingerprint sensor (116). Accordingly, the finger 212 delivers fingerprint data to the fingerprint sensor (116), with the fingerprint sensor (116) receiving the same at step 303. At step 303, the fingerprint sensor (116) and/or one or more processors (107) additionally attempt to authenticate the fingerprint data as belonging to an authorized user of the electronic device 100. In one or more embodiments, this authentication comprises comparing the fingerprint data to one or more predefined authentication references (112) stored in the memory (108) to determine whether the fingerprint data sufficiently matches at least one predefined reference.

At step 304, the one or more processors (107) actuate the voice enrollment engine (114), and optionally the audio input device (104) and voice interface engine (111) in response to the fingerprint sensor (116) receiving the fingerprint data at step 303, in combination with the user interface (106) of the electronic device 100 receiving the user input 308 initiating the voice enrollment operation 310. In one or more embodiments, the audio input device (104) is now active to receive audio input.

Decision 305 determines whether the fingerprint data has authenticated the user 211 as an authorized user of the electronic device 100. Where it does, the method 300 moves to step 306, where the fingerprint sensors (116) and/or one or more processors (107) cause the audio input device (104) to capture audio input 311. Here, the audio input 311 comprises a repeated phrase 312 requested by the voice enrollment engine (314). Upon receiving this repeated phrase 312, optionally in conjunction with other phrases, words, repeated words, or repeated phrases, the voice enrollment engine (314) establishes a voice enrollment data profile (121) for the user 211 in the memory (108) of the electronic device 100 by storing the audio input 311, or data extracted therefrom, in the voice enrollment data profile (121) when the fingerprint sensor (116) identifies the fingerprint data received at step 303 as belonging to an authorized user of the electronic device 100.

Where the fingerprint data fails to authenticate the user 211 as an authorized user of the electronic device 100, the method 300 moves to step 307. In one or more embodiments, step 307 comprises the one or more processors (107) requiring at least one additional authentication input be delivered to the user interface (106) of the electronic device 100. For example, the one or more processors (107) may prompt for a password, personal identification number (PIN), voice authentication procedure, or other higher authentication factor at the user interface (106).

When the higher authentication factor is received at the user interface (106) of the electronic device 100, the method 300 returns to decision 305 where the authentication process repeats using the higher authentication factor. In one or more embodiments, the method 300 will not proceed to step 306 until the at least one authentication factor matches a predefined criterion. Illustrating by example, if step 307 prompts the user 211 for a password, the one or more processors (107) can compare the password to the predefined authentication references (112) stored in memory (108) to determine whether there is a match, and so forth. In the illustrative example of FIG. 3, the user 211 is the authorized user of the electronic device 100. Thus, the method 300 proceeds from decision 305 to step 306 without step 307.

Figure 4:
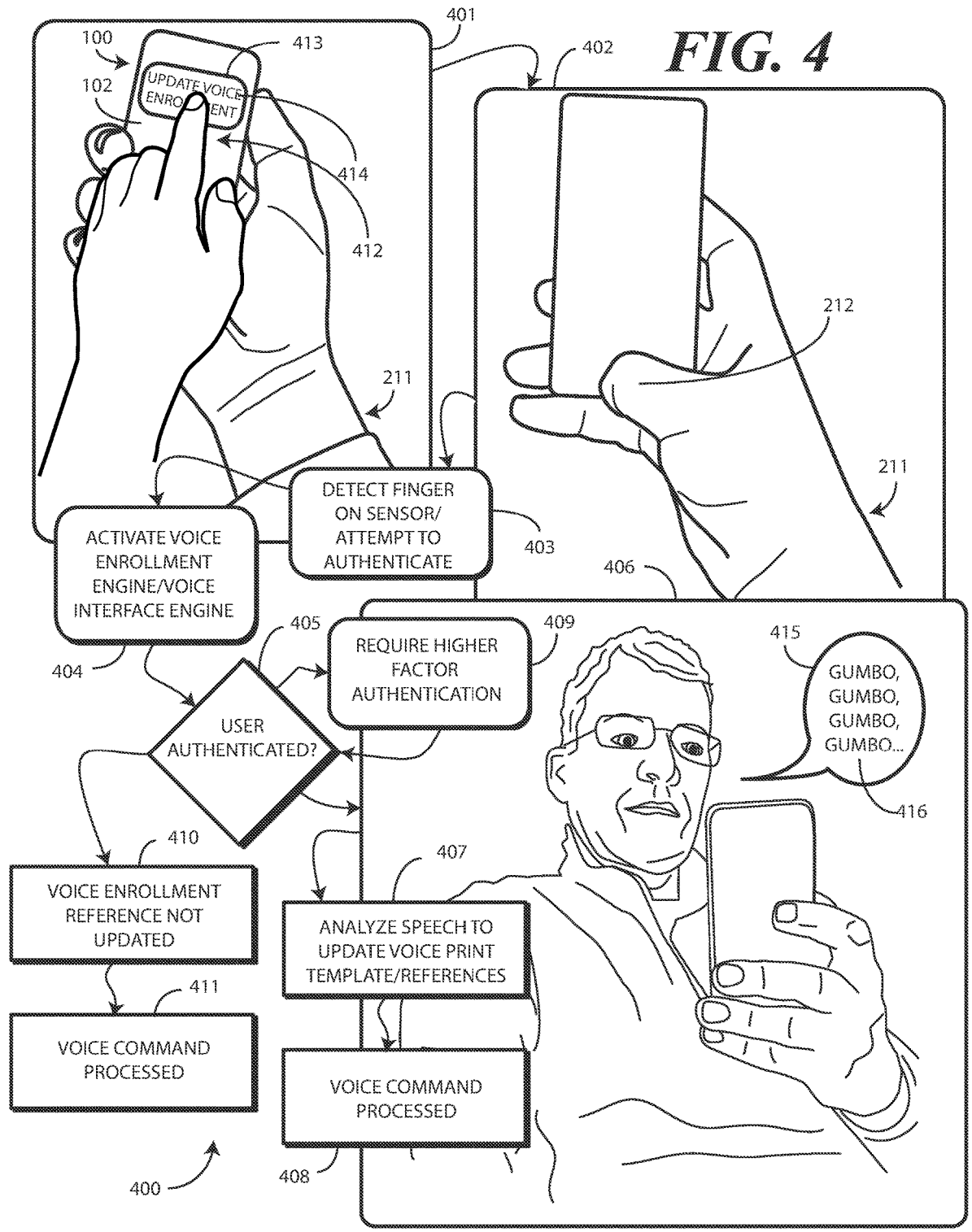
FIG. 4 illustrates another explanatory method in accordance with one or more embodiments of the disclosure.

Turning now to FIG. 4, illustrated therein is a method 400 for updating the voice enrollment data profile (121) stored in the memory (108) after it has been created using the method (300) of FIG. 3 or another method for establishing the voice enrollment data profile (121).

At step 401 a user 211 is holding an electronic device 100 configured in accordance with one or more embodiments of the disclosure. As previously described, the electronic device 100 includes a fingerprint sensor (116), one or more processors (107), a voice interface engine (111), a voice enrollment engine (114), and an audio input device (104).

In one or more embodiments, so as to enable the voice interface engine (111) to better function as a voice assistant, the voice enrollment engine (114) allows users of the system to update their voice enrollment data profile (121) in the memory (108) of the electronic device 100. This can be beneficial, for example, when a young user is growing up and experiences their voice changing due to puberty. It can also be beneficial simply when a user wants to spend more time training the voice enrollment engine (114) for better accuracy.

At step 401, the user 211 wants to update the voice enrollment data profile (121). Accordingly, the user 211 is delivering user input 412 to the display 102 of the electronic device 100 by touching a user actuation target 413 to initiate a voice enrollment update operation 414. At step 401, the user interface (106) of the electronic device 100 receives this user input 412 initiating the voice enrollment update operation 414 via the display 102.

At step 402, the user 211 places a finger 212 on the fingerprint sensor (116). Accordingly, the finger 212 delivers fingerprint data to the fingerprint sensor (116), with the fingerprint sensor (116) receiving the same at step 403. At step 403, the fingerprint sensor (116) and/or one or more processors (107) additionally attempt to authenticate the fingerprint data as belonging to an authorized user of the electronic device 100. In one or more embodiments, this authentication comprises comparing the fingerprint data to one or more predefined authentication references (112) stored in the memory (108) to determine whether the fingerprint data sufficiently matches at least one predefined reference.

At step 404, the one or more processors (107) actuate the voice enrollment engine (114), and optionally the audio input device (104) and voice interface engine (111) in response to the fingerprint sensor (116) receiving the fingerprint data at step 403, in combination with the user interface (106) of the electronic device 100 receiving the user input 412 initiating the voice enrollment update operation 414. In one or more embodiments, the audio input device (104) is now active to receive audio input.

Decision 405 determines whether the fingerprint data has authenticated the user 211 as an authorized user of the electronic device 100. Where it does, the method 400 moves to step 406, where the fingerprint sensors (116) and/or one or more processors (107) cause the audio input device (104) to capture audio input 415.

Here, the audio input 415 comprises another repeated phrase 416 requested by the voice enrollment engine (314). Upon receiving this repeated phrase 416, optionally in conjunction with other phrases, words, repeated words, or repeated phrases, at step 407 the voice enrollment engine (314) analyzes the audio input 415 to update the voice enrollment data profile (121) for the user 211 in the memory (108) of the electronic device 100 by storing the audio input 415, or data extracted therefrom, in the voice enrollment data profile (121) when the fingerprint sensor (116) identifies the fingerprint data received at step 403 as belonging to an authorized user of the electronic device 100.

Embodiments of the disclosure contemplate that in simple implementations the repeated phrase 416 may instead be replaced with a single device command (214). For example, the user 211 may simply want to improve the accuracy of executing a particular device command (214) while simultaneously delivering the device command (214) to the electronic device 100. Accordingly, the method 400 can optionally include the one or more processors (107) executing the control operation in response to the device command (214) at step 408 in such situations. Thus, step 408 can comprise the one or more processors (107) executing the control operation in response to a device command (214) when the audio input 415 includes the device command (214) after the voice enrollment engine (114) updates the voice enrollment data profile (121) with the audio input 415 at step 407.

Where the fingerprint data fails to authenticate the user 211 as an authorized user of the electronic device 100, the method 400 can take different actions. In one or more embodiments, the method 400 moves to step 409. In one or more embodiments, step 409 comprises the one or more processors (107) requiring at least one additional authentication input be delivered to the user interface (106) of the electronic device 100. For example, the one or more processors (107) may prompt for a password, personal identification number (PIN), voice authentication procedure, or other higher authentication factor at the user interface (106).

When the higher authentication factor is received at the user interface (106) of the electronic device 100, the method 400 returns to decision 405 where the authentication process repeats using the higher authentication factor. In one or more embodiments, the method 400 will not proceed to step 406 until the at least one authentication factor matches a predefined criterion. Illustrating by example, if step 409 prompts the user 211 for a password, the one or more processors (107) can compare the password to the predefined authentication references (112) stored in memory (108) to determine whether there is a match, and so forth.

As another option, where the fingerprint data fails to authenticate the user 211 as an authorized user of the electronic device 100, the method 400 moves to step 410. Since the fingerprint data failed to authenticate the user 211 as an authorized user of the electronic device 100, the voice enrollment data profile (121) is not updated. Thus, in one or more embodiments step 410 comprises the voice enrollment engine (114) leaving the voice enrollment data profile (121) unchanged in response to the fingerprint sensor (116) failing to identify the fingerprint data received at step 403 as belonging to the authorized user of the electronic device 100. Instead, if the audio input 415 included a device command (214), the one or more processors (107) simply execute the control operation in response to the device command (214) step 411.

Figure 5:
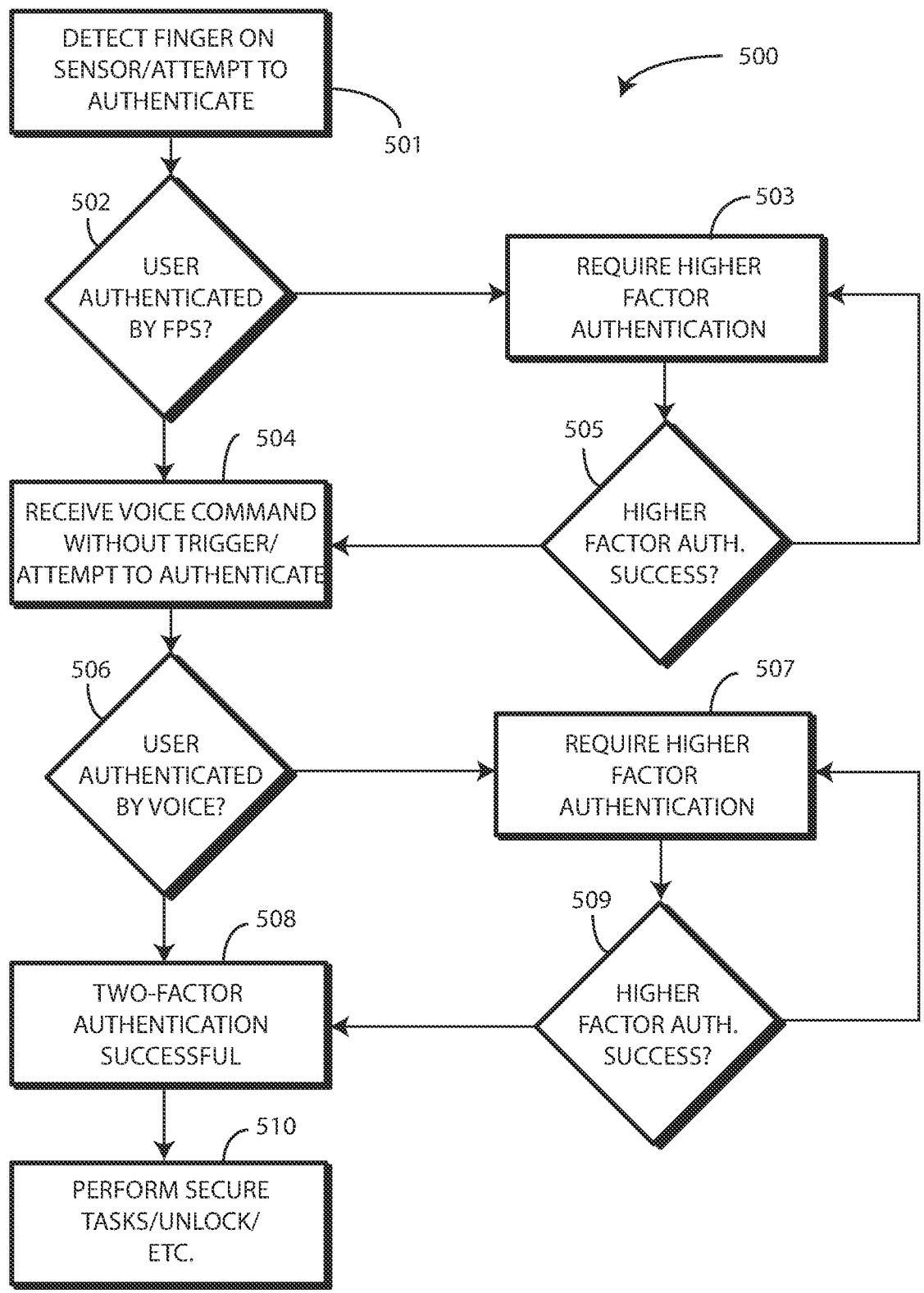
FIG. 5 illustrates still another explanatory method in accordance with one or more embodiments of the disclosure.

Turning now to FIG. 5, illustrated therein is yet another method 500 of leveraging a fingerprint sensor for enhanced security in operating an electronic device. The method 500 of FIG. 5 employs simultaneous authentication with a fingerprint sensor and voice authentication triggered by interactions with the fingerprint sensor to provide a two-factor authentication process.

Beginning at step 501, a fingerprint sensor of an electronic device receives fingerprint data. At step 501, the fingerprint sensor and/or one or more processors of the electronic device additionally attempt to authenticate the fingerprint data as belonging to an authorized user of the electronic device. In one or more embodiments, this authentication comprises comparing the fingerprint data to one or more predefined authentication references stored in a memory of the electronic device to determine whether the fingerprint data sufficiently matches at least one predefined reference.

Decision 502 determines whether the fingerprint data has authenticated the user as an authorized user of the electronic device. Where the fingerprint data fails to authenticate the user as an authorized user of the electronic device, the method 500 moves to step 503. In one or more embodiments, step 503 comprises requiring at least one additional authentication input be delivered to the user interface of the electronic device. For example, the one or more processors may prompt for a password, personal identification number (PIN), voice authentication procedure, or other higher authentication factor at the user interface.

When the higher authentication factor is received at the user interface of the electronic device, the method 500 moves to decision 505 where the authentication process repeats using the higher authentication factor. In one or more embodiments, the method 500 will not proceed to step 504 until the at least one authentication factor matches a predefined criterion. Illustrating by example, if step 503 prompts the user for a password, the one or more processors can compare the password to the predefined authentication references stored in memory to determine whether there is a match, and so forth.

Where the fingerprint sensor and/or one or more processors identify the fingerprint data as belonging to an authorized user of the electronic device or otherwise authenticates the user as an authorized user of the electronic device, as determined at decision 502, or alternatively where the at least one authentication factor matches a predefined criterion, as determined at decision 505, the method 500 moves to step 504. At step 504, the fingerprint sensors and/or one or more processors cause the audio capture device to capture audio input. Additionally, step 504 can include actuation of a voice interface engine in response to the fingerprint sensor receiving the fingerprint data at step 501.

In one or more embodiments, the audio capture device is now active to receive audio input, and the voice interface engine is active to process the voice input. Accordingly, in one or more embodiments step 504 further comprises the voice interface engine receiving the audio input and attempting to determine the identity of the user to confirm that the user delivering the audio input is in fact an authorized user of the electronic device. Illustrating by example, in one or more embodiments the voice interface engine uses the predefined authentication references stored in the memory of the electronic device, which can include basic speech models, representations of trained speech models, or other representations of predefined audio sequences, to attempt to identify a source of the audio input being an authorized user of the electronic device. Additionally, the voice interface engine can determine whether a device command is in the audio input as well at step 504. In this manner, the one or more processors and/or voice interface engine can determine whether the source an authorized user of the electronic device.

Decision 506 determines whether the source of the audio input can be identified by the voice interface engine from the audio input has authenticated the user as an authorized user of the electronic device. Where the voice interface engine fails to authenticate the user as an authorized user of the electronic device from the audio input, the method 500 moves to step 507. In one or more embodiments, step 507 comprises requiring at least one additional authentication input be delivered to the user interface of the electronic device.

When the higher authentication factor is received at the user interface of the electronic device, the method 500 moves to decision 509 where the authentication process repeats using the higher authentication factor. In one or more embodiments, the method 500 will not proceed to step 508 until the at least one authentication factor matches a predefined criterion.

Where the voice interface engine and/or one or more processors identify the audio input as emanating from a source who is an authorized user of the electronic device, as determined at decision 506, or alternatively where the at least one authentication factor matches a predefined criterion, as determined at decision 5059, the method 500 moves to step 508, where the two factor authentication process performed by the simultaneous authentication with fingerprint data and audio input triggered by actuation of the fingerprint sensor is complete.

At step 510, one or more processors of the electronic device that are operable with the voice interface engine execute a control operation in response to the device command identified in the audio input. As shown in FIG. 5, in one or more embodiments step 510 occurs only when the voice interface engine identifies the source of the audio input as the authorized user of the electronic device and the fingerprint sensor identifies captured fingerprint data as belonging to an authorized user of the electronic device.

Figure 6:
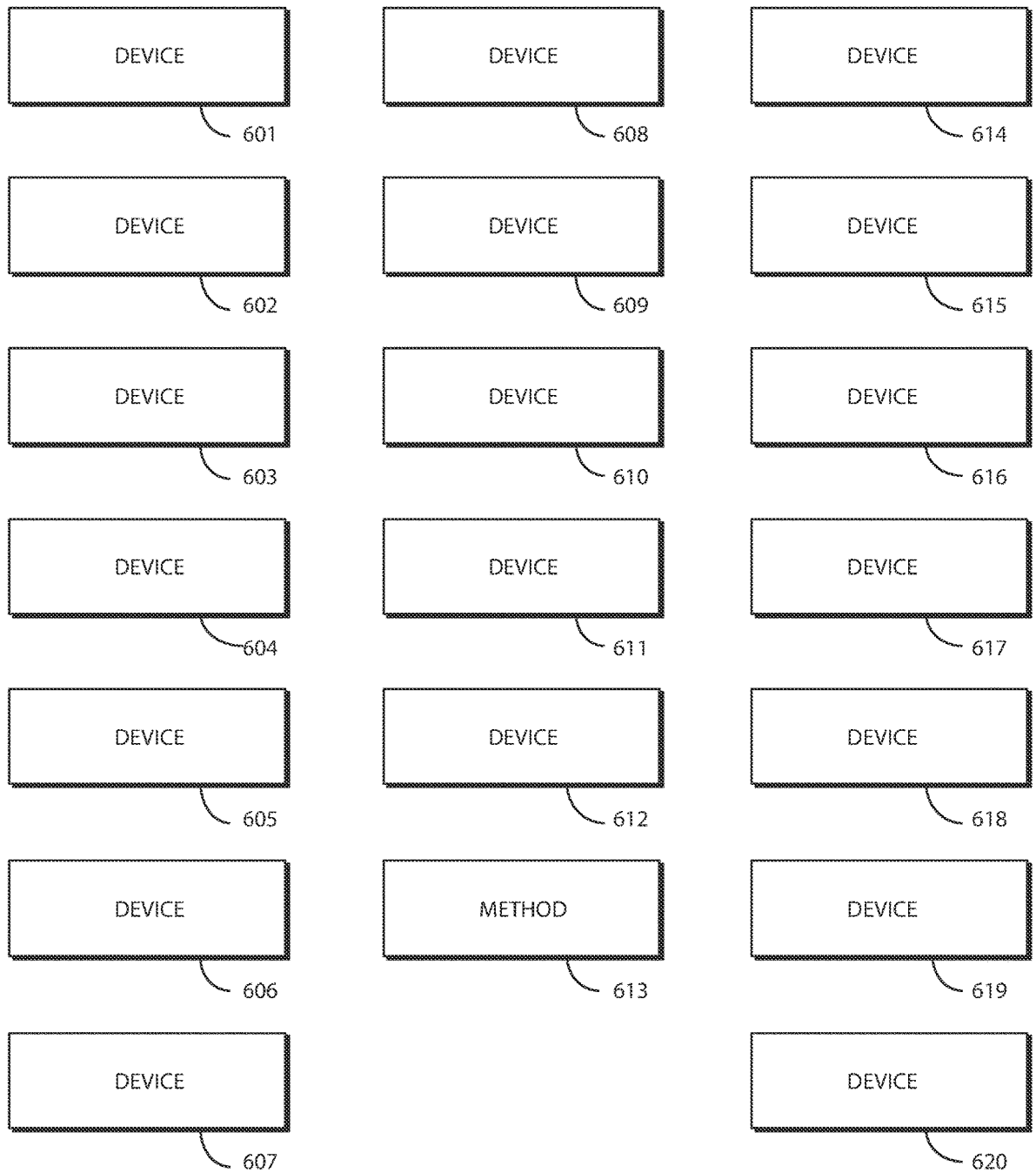
FIG. 6 illustrates various embodiments of the disclosure.

Turning now to FIG. 6, illustrated therein are various embodiments of the disclosure. At 601, an electronic device comprises an audio capture device operable to receive audio input. At 601, the electronic device comprises a fingerprint sensor. At 601, the electronic device comprises one or more processors, which operable with the audio capture device and the fingerprint sensor.

At 601, the one or more processors are configured to execute a control operation in response to a device command preceded by a trigger phrase identified in the audio input when in a first mode of operation. At 601, the one or more processors transition from the first mode of operation to a second mode of operation in response to the fingerprint sensor receiving fingerprint data. At 601, the one or more processors execute the control operation without requiring the trigger phrase to precede the device command.

At 602, the one or more processors of 601 actuate the audio capture device in response to the fingerprint sensor receiving the fingerprint data. At 603, the second mode of operation of 601 comprises a normal mode of operation when the fingerprint sensor identifies the fingerprint data as belonging to an authorized user of the electronic device. At 604, the second mode of operation of 601 comprises a privacy mode of operation when the fingerprint sensor fails to identify the fingerprint data as belonging to an authorized user of the electronic device.

At 605, the electronic device of 604 comprises a user interface. At 605, the one or more processors require capture of at least one additional authentication input by the user interface when both the fingerprint sensor fails to identify the fingerprint data as belonging to the authorized user of the electronic device and the device command involves private data. At 606, the one or more processors of 605 execute the control operation involving the private data only when the at least one additional authentication input matches a predefined criterion.

At 607, an electronic device comprises an audio capture device. At 607, the electronic device comprises a fingerprint sensor receiving fingerprint data. At 607, upon identifying the fingerprint data as belonging to an authorized user of the electronic device, the fingerprint sensor causes the audio capture device capture audio input.

At 607, the electronic device comprises a voice interface engine operable with the audio capture device. At 607, the voice interface engine, upon identifying a device command in the audio input, attempts identification of a source of the audio input from the audio input. At 607, the electronic device comprises one or more processors operable with the voice interface engine. At 607, the one or more processors execute a control operation in response to the device command identified in the audio input only when the voice interface engine identifies the source of the audio input as the authorized user of the electronic device.

At 608, the electronic device of 607 further comprises a user interface. At 608, the one or more processors require capture of at least one additional authentication input by the user interface when the fingerprint sensor fails to identify the fingerprint data as belonging to the authorized user of the electronic device. At 609, the one or more processors of 608 execute the control operation only when the at least one additional authentication input matches a predefined criterion.

At 610, the electronic device of 607 further comprises a user interface. At 610, the one or more processors require capture of at least one additional authentication input by the user interface when the fingerprint sensor identifies the fingerprint data as belonging to the authorized user of the electronic device and the voice interface engine fails to identify the source of the audio input as the authorized user of the electronic device. At 611, the one or more processors of 610 execute the control operation only when the at least one additional authentication input matches a predefined criterion.

At 612, an electronic device comprises one or more processors and an audio capture device operable with the one or more processors. At 612, the electronic device comprises a voice enrollment engine facilitating voice enrollment enabling execution of device commands by the one or more processors in response to audible input received by the audio capture device.

At 612 the electronic device comprises a user interface operable with the one or more processors. At 612, the user interface receives user input initiating a voice enrollment operation. At 612, the electronic device comprises a fingerprint sensor receiving fingerprint data after the user interface receives the user input initiating the voice enrollment operation. At 612, upon identifying the fingerprint data as belonging to an authorized user of the electronic device, the fingerprint sensor causes the audio capture device to capture audio input.

At 613, the electronic device of 612 further comprises a memory operable with the one or more processors. At 613, the voice enrollment operation establishes a voice enrollment data profile in the memory. At 613, the voice enrollment engine stores the audio input in the voice enrollment data profile when the fingerprint sensor identifies the fingerprint data as belonging to the authorized user of the electronic device.

At 614, the one or more processors of 613 require capture of at least one additional authentication input when the fingerprint sensor fails to identify the fingerprint data as belonging to the authorized user of the electronic device.

At 615, the fingerprint sensor of 613 receives additional fingerprint data after the voice enrollment engine establishes the voice enrollment data profile in the memory and while the audio capture device captures additional audio input. At 615, the voice enrollment engine, upon the fingerprint sensor identifying the additional fingerprint data as belonging to the authorized user of the electronic device, updates the voice enrollment data profile with the additional audio input.

At 616, the additional audio input of 615 comprises a device command. At 616, the one or more processors execute a control operation in response to the device command after the voice enrollment engine updates the voice enrollment data profile with the additional audio input. At

617, the fingerprint sensor of 616, upon receiving the additional fingerprint data, causes the audio capture device to capture the additional audio input.

At 618, the fingerprint sensor of 613 receives additional fingerprint data after the voice enrollment engine establishes the voice enrollment data profile in the memory and while the audio capture device captures additional audio input comprising a device command. At 618, the one or more processors, upon the fingerprint sensor failing to identify the additional fingerprint data as belonging to the authorized user of the electronic device, execute a control operation in response to the device command.

At 619, the device command of 618 comprises a call to action. At 620, the voice enrollment engine of 619 leaves the voice enrollment data profile unchanged in response to the fingerprint sensor failing to identify the additional fingerprint data as belonging to the authorized user of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   an audio capture device;
   a fingerprint sensor receiving fingerprint data and, upon identifying the fingerprint data as belonging to an authorized user of the electronic device, causing the audio capture device to capture audio input;
   a voice interface engine operable with the audio capture device, the voice interface engine, upon identifying a device command in the audio input, attempting identification of a source of the audio input from the audio input; and
   one or more processors operable with the voice interface engine, the one or more processors executing a control operation in response to the device command identified in the audio input only when the voice interface engine identifies the source of the audio input as the authorized user of the electronic device.

2. The electronic device of claim 1, further comprising a user interface, the one or more processors requiring capture of at least one additional authentication input by the user interface when the fingerprint sensor fails to identify the fingerprint data as belonging to the authorized user of the electronic device.

3. The electronic device of claim 2, the one or more processors executing the control operation only when the at least one additional authentication input matches a predefined criterion.

4. The electronic device of claim 1, further comprising a user interface, the one or more processors requiring capture of at least one additional authentication input by the user interface when the fingerprint sensor identifies the fingerprint data as belonging to the authorized user of the electronic device and the voice interface engine fails to identify the source of the audio input as the authorized user of the electronic device.

5. The electronic device of claim 4, the one or more processors executing the control operation only when the at least one additional authentication input matches a predefined criterion.

* * * * *